United States Patent
Wei et al.

(10) Patent No.: US 7,825,621 B2
(45) Date of Patent: Nov. 2, 2010

(54) JUNCTION TEMPERATURE REDUCTION FOR THREE PHASE INVERTERS MODULES

(75) Inventors: Lixiang Wei, Whitefish Bay, WI (US); Russel J. Kerkman, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 401 days.

(21) Appl. No.: 11/845,885

(22) Filed: Aug. 28, 2007

(65) Prior Publication Data

US 2009/0058350 A1 Mar. 5, 2009

(51) Int. Cl.
 *H02P 27/04* (2006.01)
(52) U.S. Cl. .................. 318/801; 318/811; 318/822; 318/471
(58) Field of Classification Search .......... 318/801, 318/811, 822, 823, 471, 599, 810
See application file for complete search history.

(56) References Cited

U.S. PATENT DOCUMENTS

| 5,936,856 A * | 8/1999 | Xiang .................. 363/98 |
| 6,185,115 B1 * | 2/2001 | Sul et al. .............. 363/37 |
| 6,233,396 B1 * | 5/2001 | Kuwada et al. ........ 388/811 |
| 6,617,819 B2 * | 9/2003 | Dohmae et al. ........ 318/599 |
| 6,710,564 B2 * | 3/2004 | Shibuya et al. ..... 318/400.22 |
| 7,141,943 B2 * | 11/2006 | Song et al. ........ 318/400.34 |
| 7,265,954 B2 * | 9/2007 | Hikawa et al. ......... 361/29 |
| 2006/0067092 A1 * | 3/2006 | Nondahl et al. ........ 363/37 |

* cited by examiner

*Primary Examiner*—Walter Benson
*Assistant Examiner*—Thai Dinh
(74) *Attorney, Agent, or Firm*—Fletcher Yoder LLP; Alexander R. Kuszewski; John M. Miller (57) ABSTRACT

Provided is a motor controller and method of controlling a motor with an improved maximum junction temperature rating. In accordance with one aspect of the present invention, a motor is controlled by varying a common mode voltage duty ratio for a plurality of solid state switching devices in a power inverter, generating drive signals for the solid state switching devices based at least in part upon the common mode voltage duty ratio, and changing states of the solid state switching devices based upon the drive signals.

25 Claims, 9 Drawing Sheets

JUNCTION TEMPERATURE REDUCTION FOR THREE PHASE INVERTERS MODULES

BACKGROUND

The present invention relates generally to the field of electrical power converters and inverters. More particularly, the invention relates to techniques for controlling such devices so as to reduce their thermal load.

As the field of power electronics continues a trend toward greater packaging density, higher switching speed, and rapid power dissipation, the systems which employ power semiconductors increasingly operate at higher temperatures. Higher operating temperatures, however, tend to increase system failure rates and reduce reliability. A manufacturer may improve reliability by limiting the maximum operating temperature, choosing power semiconductor modules with appropriately low maximum junction temperature ratings. Often, however, lower maximum junction temperature ratings are achieved with a cost of decreased performance. It is thus advantageous to reduce the maximum junction temperature of a power semiconductor module while maintaining the same output power.

A three-phase inverter module is one such power semiconductor which may benefit from a reduction of maximum junction temperature rating. Commonly found in variable frequency motor drives, a three phase inverter module takes in DC power and outputs a three-phase sine wave at a desired output frequency. The three phase inverter module achieves the output waveform by rapidly switching insulated gate bipolar transistors (IGBTs) located on three parallel legs connecting a DC power source and a motor. By varying the fraction of the switching time each IGBT remains open on each of the three legs, a three phase waveform is produced.

The maximum junction temperature of a three-phase inverter module increases as the output frequency decreases, reaching a zenith when the output frequency nears 0 Hz, known as DC condition. Two primary reasons may explain the relationship. First, when a three-phase inverter module operates at low-frequency AC condition or at DC condition, power losses arise among the IGBTs unevenly. These effects may become magnified under a DC condition, when at certain output phase angles the IGBTs of only two of the three legs may sustain substantially all power losses. Secondly, under a low-frequency AC condition, the junction-to-case thermal time constants of the inverter module may grow comparatively small relative to the output period. Heat may thus dissipate from IGBTs unevenly. As a result, a much higher variation in temperature among the IGBTs of an inverter module occurs when operating at a low-frequency AC condition or at a DC condition.

While attempts have been made to mitigate the effects of a high maximum junction temperature, such efforts either fail to reduce the maximum junction temperature or tend to introduce additional problems. For example, using a thermal manager to predict temperature and avoid excessive temperatures may protect an inverter module from failure, but does not reduce the module's maximum junction temperature. As a result, the overall rating of the inverter cannot be maximized. Similarly, discontinuous pulse width modulation (DPWM) may be used to reduce junction temperature when an inverter module operates at low-frequency AC conditions or at DC conditions, but doing so increases the harmonic content and ripple current of the system.

BRIEF DESCRIPTION

The invention provides a motor controller and method of controlling a motor to address such needs. In accordance with one aspect of the present invention, a motor is controlled by varying a common mode voltage duty ratio for a plurality of solid state switching devices in a power inverter, generating drive signals for the solid state switching devices based at least in part upon the common mode voltage duty ratio, and changing states of the solid state switching devices based upon the drive signals.

In accordance with another aspect of the present invention, the common mode voltage duty ratio is varied by choosing an optimal common mode voltage duty ratio dependent on a phase angle of an output current of the inverter. The optimal common mode voltage duty ratio is chosen by determining a first possible optimal common mode voltage duty ratio which reduces the temperature differences among a plurality of solid state switching devices and associated diodes on a leg carrying maximum current in a power inverter. A second possible optimal common mode voltage duty ratio is determined which causes the temperature of a plurality of solid state switching devices on a leg not carrying maximum current to equate to the temperature of the plurality of solid state switching devices on the leg carrying maximum current in the power inverter. A third possible optimal common mode voltage duty ratio is also determined which causes the temperature of a plurality of diodes on a leg not carrying maximum current to equate to the temperature of the plurality of solid state switching devices on the leg carrying maximum current in the power inverter. An optimal common mode voltage duty ratio is then chosen from among the first possible optimal common mode voltage duty ratio, second possible common mode voltage duty ratio, and third possible common mode voltage duty ratio.

In accordance with yet another aspect of the present invention, an amplitude of the optimal common mode voltage duty ratio is stored in memory, and the optimal common mode voltage duty ratio is estimated in real-time as a periodic function with an amplitude equivalent to the amplitude previously stored in memory.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
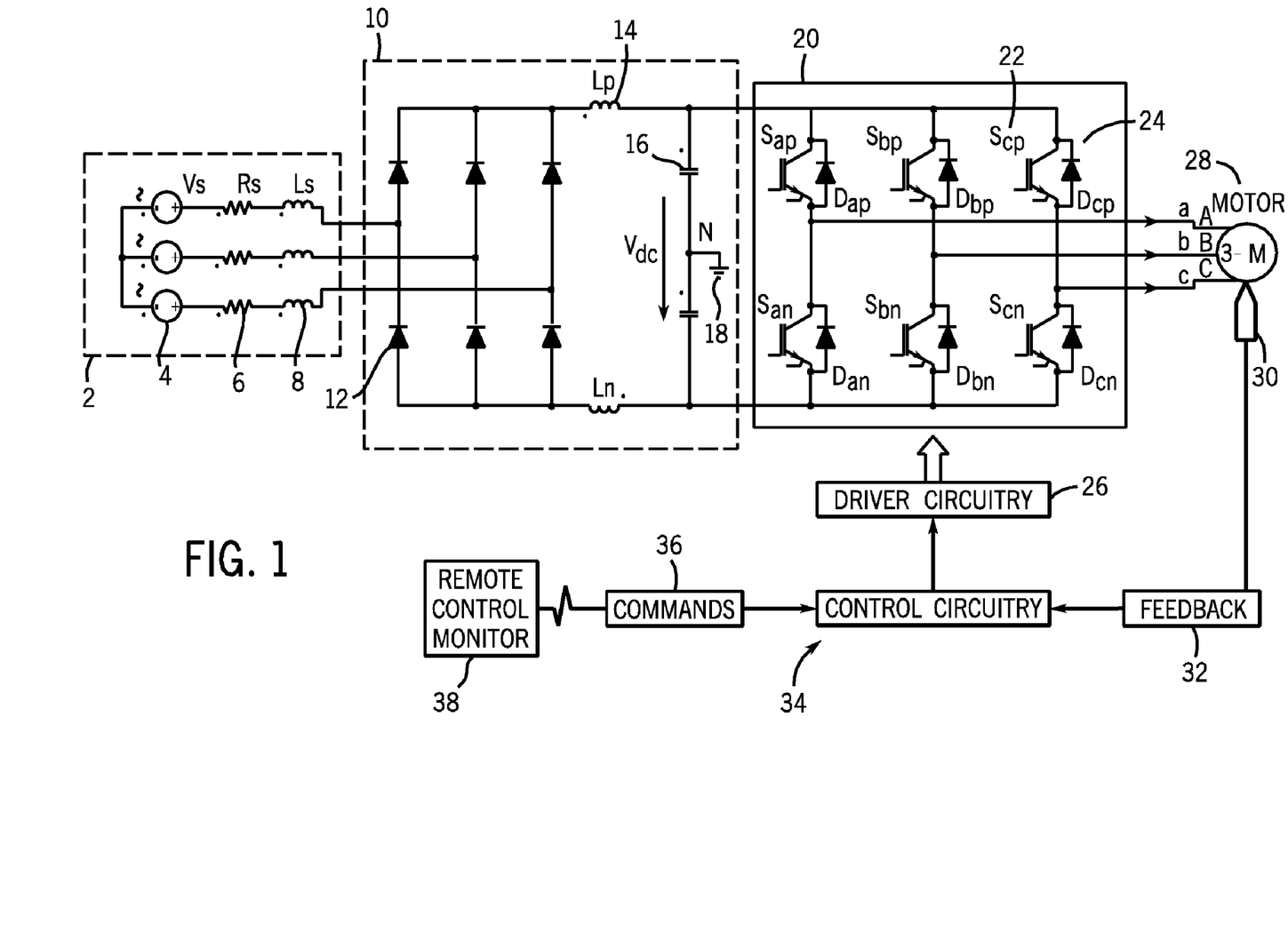
FIG. 1 is a diagrammatical model of an exemplary motor drive system employing control circuitry for reducing the maximum junction temperature of the inverter module in accordance with one embodiment of the present invention.

FIG. 1 is a diagrammatical representation of an exemplary motor drive system employing control circuitry for reducing the maximum junction temperature of the inverter module. A three phase power source 2, represented by three legs comprising an AC voltage source 4, a source resistance 6, and a source inductance 8, provides three phase AC power of constant frequency to rectifier circuitry 10. In the rectifier circuitry 10, six diodes 12 provide full wave rectification of the three phase voltage waveform. Each leg of the three phase power source 2 entering rectifier circuitry 10 is coupled between two diodes 12 arranged in series, anode to cathode, which span from a negative DC bus line to a positive DC bus line. Line inductance 14 resides on both the positive and negative lines of the rectifier circuitry 10, but two capacitors 16 are configured to minimize their effect. The two capacitors 16 link the positive DC bus line and negative DC bus line to neutral 18, largely removing the AC component of the rectified voltage waveform. The resulting voltage difference between the positive DC bus line and the negative DC bus line remains essentially a DC voltage difference (labeled $V_{dc}$).

An inverter module 20 accepts the positive and negative lines of DC voltage from the rectifier circuitry 10 as inputs, outputting a discretized three phase waveform at a desired frequency, independent of the frequency of three phase power source 2. At the positive end of each leg a, b, and c, an insulated gate bipolar transistor (IGBT) switch 22 (labeled $S_{ap}$, $S_{bp}$, or $S_{cp}$) paired with a diode 24 (labeled $D_{ap}$, $D_{bp}$ or $D_{cp}$) interconnects the positive DC bus line to the leg a, b, or c output. Similarly, at the negative end of each leg a, b, or c, an insulated gate bipolar transistor (IGBT) switch 22 (labeled $S_{an}$, $S_{bn}$, or $S_{cn}$), paired with a diode 24 (labeled $D_{an}$, $D_{bn}$ or $D_{cn}$), interconnects the negative DC bus line to the leg a, b, or c output. Driver circuitry 26 signals the IGBT switches 22 to rapidly close and open, resulting in a three phase waveform output across legs a, b, and c. Phase A is output on leg a, phase B is the output on leg b, and phase C is output on leg c.

The three legs a, b, and c provide three phase power to an external load, such as a motor 28. Sensors 30 gather information about the power supplied to the motor 28, which serves as feedback 32 for the control circuitry 34. The control circuitry 34 takes commands 36 and feedback 32 to formulate the signals necessary to induce a three phase waveform in the inverter module through driver circuitry 26. A networked remote control monitor 38 may be employed to supply commands 36 to the control circuitry 34.

Figure 2:
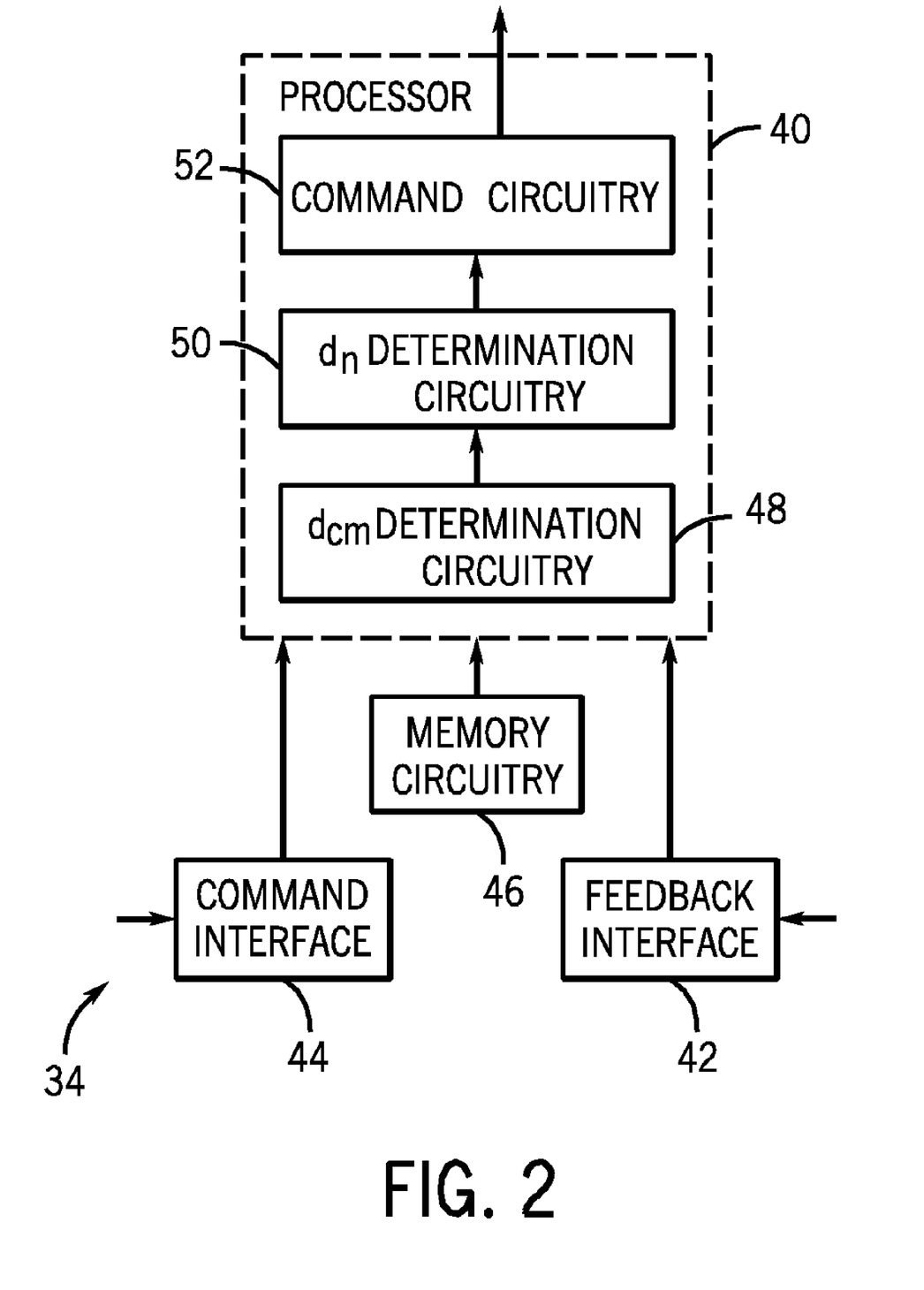
FIG. 2 is a diagrammatical representation of exemplary control circuitry for a motor drive system in accordance with one embodiment of the present invention.

FIG. 2 diagrammatically represents exemplary control circuitry 34 in greater detail. To determine the necessary switching signals to send to driver circuitry 26, a processor 40 obtains feedback data through a feedback interface 42, commands through a command interface 44, and other data, such as standard preset values in a lookup table, from memory circuitry 46. The processor 40 then rapidly calculates the signals required to produce a three phase waveform by switching each IGBT switch 22 of inverter module 20. For a given switching frequency $f_s$ (often 4 kHz or 8 kHz) at each given voltage command phase angle $\theta_v$, the signals from processor 40 represent the precise fractions of each switching period that a switch remains closed or open. Because the voltage command phase angle $\theta_v$ changes continually, the switching signals similarly change continually to produce the three phase output waveform.

According to a method of the present invention, the processor 40 may first determine a common mode voltage duty ratio ($d_{cm}$) with $d_{cm}$ determination circuitry 48. The common mode voltage duty ratio $d_{cm}$ represents one component of the total duty ratio for each leg a, b, and c relative to the negative DC bus (termed $d_{an}$, $d_{bn}$, and $d_{cn}$). Having determined the common mode voltage duty ratio $d_{cm}$, the processor 40 may then calculate the total duty ratio for each phase A, B, and C with $d_n$ determination circuitry 50. After determining the three duty ratios $d_{an}$, $d_{bn}$, and $d_{cn}$, the processor may next determine the necessary IGBT switch 22 control signals using command circuitry 52. Command circuitry 52 may apply pulse width modulation (PWM) using the three duty ratios to obtain the precise amount of time each switch must remain open and closed.

The $d_{cm}$ determination circuitry 48, $d_n$ determination circuitry 50, and command circuitry 52 operate to minimize the maximum junction temperature according to one method of the present technique. To simplify further discussion of the present technique, seven approximations or assumptions are stipulated. First, the motor drive operates at steady state with very low speed AC or DC conditions. Second, the command circuitry 52 utilizes sine wave/triangle wave comparison pulse width modulation (PWM), though a similar improvement may be obtained using space vector pulse width modulation (SVPWM). Third, because the stator resistance value for a motor drive operating at steady state may be generally 3% to 5% of the rated resistance, the maximum amplitude of the output voltage need only reach 3% to 5% of maximum positive and negative voltage to supply all necessary current to the motor; the maximum output voltage amplitude ratio (k) is thus selected to be 0.05. Fourth, since the motor is operating at a very low frequency, the output power factor of the inverter is treated as being equal to 1. Fifth, because the junction-to-heat-sink thermal time constants of the IGBT switches remain far smaller than the period of the output waveform, any corresponding thermal capacitance is negligible. Sixth, the bottom of the heat-sink beneath the IGBT switches is treated as isothermal with a uniform temperature. Finally, power losses are calculated under rated conditions for a Rockwell 480V/50 hp drive with a DC bus voltage of 650V, 4 kHz switching frequency, and 77 $A_{rms}$ inverter current; as such, the junction-to-heat-sink thermal impedances for an IGBT switch ($R_{jO}$) and for a diode ($R_{dO}$) are estimated as 0.42 K/W and 0.66 K/W, respectively.

The duty ratios for phases A, B, and C ($d_a$, $d_b$, and $d_c$), as a function of the common mode voltage duty ratio $d_{cm}$ and phase angle of voltage command of the inverter $\theta_v$, may be represented as:

$$\begin{cases} d_a = 0.5 + d_{cm} + k\cos(\theta_v) \\ d_b = 0.5 + d_{cm} + k\cos\left(\theta_v - \frac{2\pi}{3}\right) \\ d_c = 0.5 + d_{cm} + k\cos\left(\theta_v + \frac{2\pi}{3}\right). \end{cases} \quad (1)$$

In equation (1), above, $\theta_v$ represents the angle of the voltage command of the inverter and, as previously discussed, k represents the output voltage amplitude ratio, approximated at 0.05:

$$\theta_v = 2\pi f t \text{ and } k = \frac{V_m}{V_{dc}/2} \approx 0.05. \quad (2)$$

With the above approximations or assumptions, the output voltages for phases A, B, and C relative to the neutral DC bus voltage ($V_{an}$, $V_{bn}$, and $V_{cn}$) may be represented as:

$$\begin{cases} V_{an} = (d_a - 0.5 - d_{cm}) \cdot V_{dc}/2 \\ V_{bn} = (d_b - 0.5 - d_{cm}) \cdot V_{dc}/2 \\ V_{cn} = (d_c - 0.5 - d_{cm}) \cdot V_{dc}/2. \end{cases} \quad (3)$$

Similarly, when $I_m$ represents the maximum amplitude of the output current, the output current for each phase A, B, and C may be represented as:

$$\begin{cases} i_a \approx I_m\cos(\theta_i) = I_m\cos(\theta_v) \\ i_b \approx I_m\cos\left(\theta_i - \frac{2\pi}{3}\right) = I_m\cos\left(\theta_v - \frac{2\pi}{3}\right) \\ i_c \approx I_m\cos\left(\theta_i + \frac{2\pi}{3}\right) = I_m\cos\left(\theta_v + \frac{2\pi}{3}\right). \end{cases} \quad (4)$$

Figure 3:
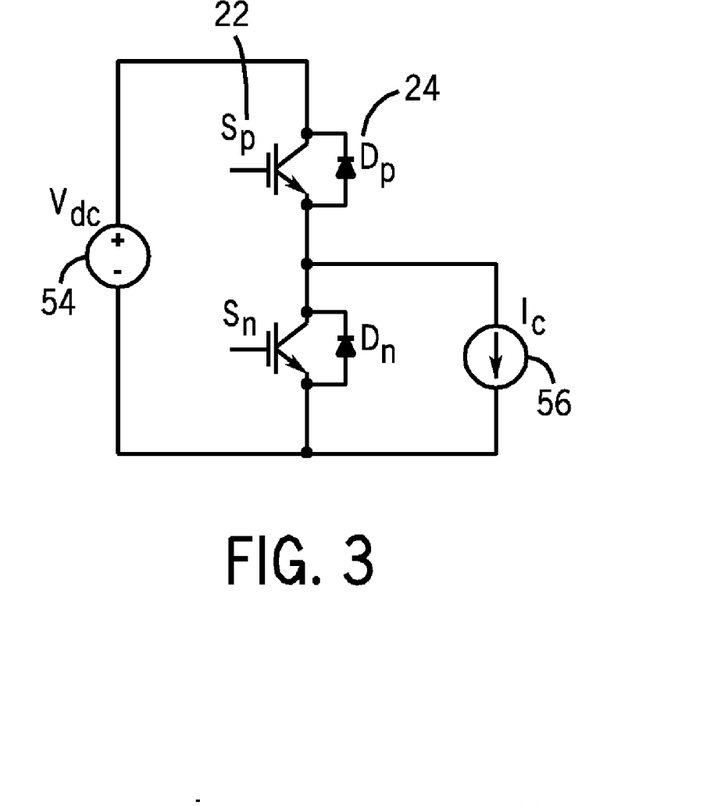
FIG. 3 represents a simplified model of one leg of an inverter module employed by a motor drive system in accordance with one embodiment of the present invention.

FIG. 3 represents a model of a single phase leg of the three phase inverter module, which may provide, in combination with equations (1)-(4) above, a manner of calculating the conduction losses and switching losses of a complete three phase inverter module. Representing the voltage difference between the positive and negative DC bus lines of a three phase inverter, DC voltage supply 54 provides a constant supply of DC voltage (labeled $V_{dc}$). An IGBT switch 22 ($S_p$), paired with a diode 24 ($D_p$), interconnects the positive DC voltage node to the output. Similarly, an IGBT switch 22 ($S_n$), paired with a diode 24 ($D_n$), interconnects the negative DC voltage node to the output. The $S_n$ IGBT switch 22 and the $S_p$ IGBT switch 22 each receive a distinct gating signal, switching each IGBT switch closed when the respective gating signal is high and open when the signal is low. Output current 56 (labeled $I_c$) connects the output to the negative voltage node.

Figure 4:
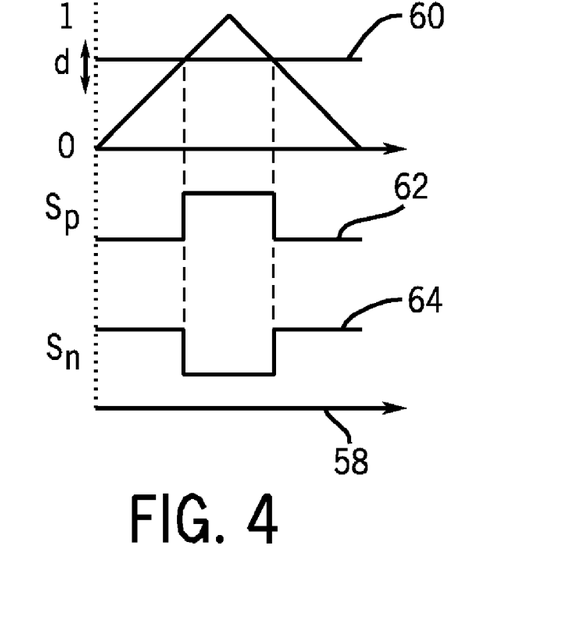
FIG. 4 is a graph illustrating the relationship between duty ratio and the positive and negative gating signals of each switch in accordance with one embodiment of the present invention.

FIG. 4 depicts a graph relating the gating signals of the two IGBT switches 22 of FIG. 3 and the duty ratio (labeled d). The abscissa of the graph represents time across one switching period 58. Because the switching frequency $f_s$ is typically very fast, e.g. 4 kHz or 8 kHz, one switching period 58 is correspondingly short, necessarily repeating thousands of times each second. For each switching period 58, a prescribed duty ratio 60, overlaid against a triangle pulse of one switching period with a peak value of 1, determines the $S_p$ IGBT switch gating signal 62 and the $S_n$ IGBT switch gating signal 64. The point in time at which the duty ratio value first intersects the triangle pulse represents the point in time at which the $S_p$ IGBT switch gating signal 62 rises from low to high and the $S_n$ IGBT switch gating signal 64 drops from high to low. The second intersection of the duty ratio value and the triangle pulse represents the point in time at which the $S_p$ IGBT switch gating signal 62 returns to low from high and the $S_n$ IGBT switch gating signal 64 returns to high from low. Since the duty ratio varies as a function of the voltage output phase angle, as apparent in equation (2), above, the $S_p$ IGBT switch gating signal 62 and the $S_n$ IGBT switch gating signal 64 also depend on the voltage output phase angle.

Under the model of the single phase leg represented in FIGS. 3 and 4, the forward voltages of the $S_p$ and $S_n$ IGBT switches 22 and $D_p$ and $D_n$ diodes 24 may be further represented as a voltage source plus a small resistance during conduction. The forward voltage drop of an IGBT switch 22, $V_{ce}(t)$, and the forward voltage drop of a diode 24, $V_f(t)$, may be represented as:

$$V_{ce}(t) = V_{ce0} + R_I I_c(t)$$

$$V_f(t) = V_{f0} + R_d I_c(t) \quad (5).$$

In the above equation, $V_{ce0}$ and $V_{f0}$ represent the forward voltage when current is almost zero, and $R_I$ and $R_d$ represent the IGBT switch or diode slope resistance. Values for $V_{ce0}$, $V_{f0}$, $R_I$ and $R_d$ may be obtained from the IGBT datasheet directly.

Total power losses for the single phase leg may be calculated as both conduction losses and switching losses. Conduction occurs for the $S_p$ IGBT switch 22 and the $D_n$ diode 24 when the $S_p$ IGBT switch gating signal 62 is high and the $S_n$ IGBT switch gating signal 64 is low. Similarly, conduction occurs for the $S_n$ IGBT switch 22 and the $D_p$ diode 24 when the $S_n$ IGBT switch gating signal 64 is high and the $S_p$ IGBT switch gating signal 62 is low. Accordingly, conduction losses may be calculated as:

$$\begin{cases} P_{sp}(t) = d \cdot V_{ce}(t) \cdot I_c(t) \\ P_{sn}(t) = 0 \\ P_{dp}(t) = 0 \\ P_{dn}(t) = (1-d) \cdot V_f(t) \cdot I_c(t) \end{cases} \quad \text{when } I_c(t) \geq 0, \text{ and} \quad (6)$$

$$\begin{cases} P_{sp}(t) = 0 \\ P_{sn}(t) = (1-d) \cdot V_{ce}(t) \cdot |I_c(t)| \\ P_{dp}(t) = d \cdot V_f(t) \cdot |I_c(t)| \\ P_{dn}(t) = 0 \end{cases} \quad \text{when } I_c(t) < 0.$$

Switching losses for the single phase leg may be calculated from the motor drive datasheet. The average switching losses of an IGBT switch 22 and a diode 24, $P_{sw,IGBT}(t)$ and $P_{sw,diode}(t)$, may be calculated as:

$$P_{sw\text{-}IGBT}(t) = E_{onoff} \cdot I_c(t) \frac{f_s V_{dc}}{V_{nom} I_{nom}} = k_s f_s V_{dc} |I_c(t)| \quad (7)$$

$$P_{sw\text{-}Diode}(t) = E_{rec} \cdot I_c(t) \frac{f_s V_{dc}}{V_{nom} I_{nom}} = k_d f_s V_{dc} |I_c(t)|,$$

where $E_{onoff}$ and $E_{rec}$ represent energy spent during switching, and $V_{nom}$ and $I_{nom}$ represent the rated DC bus voltage and current. The symbols $k_s$ and $k_d$ are employed to simplify the single phase leg switching loss equation (7).

The total power losses for a three-phase inverter may be obtained in light of the power loss equations for a single phase leg (6) and (7). By combining equations (1)-(6), the conduction losses for any phase x (where x represents a, b, or c) of the inverter may be represented as:

$$\begin{cases} P_{cond,sxp}(t) = d_x \cdot V_{ce}(t) \cdot i_x(t) \\ P_{cond,sxn}(t) = 0 \\ P_{cond,dxp}(t) = 0 \\ P_{cond,dxn}(t) = (1 - d_x) \cdot V_f(t) \cdot i_x(t) \end{cases} \text{for } i_x(t) \geq 0, \text{ and} \quad (8)$$

$$\begin{cases} P_{cond,sxp}(t) = 0 \\ P_{cond,sxn}(t) = (1 - d_x) \cdot V_{ce}(t) \cdot |i_x(t)| \\ P_{cond,dxp}(t) = d_x \cdot V_f(t) \cdot |i_x(t)| \\ P_{cond,dxn}(t) = 0 \end{cases} \text{for } i_x(t) < 0.$$

Equation (8), above, illustrates that the conduction loss calculation for leg of phase x (where x represents a, b, or c) of the three phase inverter is influenced by the common mode voltage duty ratio $d_{cm}$. More particularly, when $i_x(t)$ is greater than 0, an increase in the common mode voltage duty ratio $d_{cm}$ causes the conduction losses of the $S_{xp}$ IGBT switch 22 to increase and the conduction losses of the $D_{xn}$ diode 24 to decrease. On the other hand, when $i_x(t)$ is less than 0, an increase in the common mode voltage duty ratio $d_{cm}$ causes the conduction losses of the $S_{xn}$ IGBT switch 22 to decrease and the conduction losses of the $D_{xp}$ diode 24 to increase. From equation (8), above, the total conduction losses of the $S_{xp}$ and $S_{xn}$ IGBT switches 22 and the $D_{xp}$ and $D_{xn}$ diodes 24 for each leg of phase x (where x represents a, b, or c) may be described as follows:

$$P_{cond,sx}(t) = \begin{cases} P_{cond,sxp}(t) & i_x(t) \geq 0 \\ P_{cond,sxn}(t) & i_x(t) < 0 \end{cases} \text{ and} \quad (9)$$

$$P_{cond,dx}(t) = \begin{cases} P_{cond,dxn}(t) & i_x(t) \geq 0 \\ P_{cond,dxp}(t) & i_x(t) < 0 \end{cases}.$$

Similarly, the switching losses for each leg of phase x (where x represents a, b, or c) do not depend on the common mode voltage duty ratio $d_{cm}$. From equation (7), above, the following equations may be derived for each leg of phase x:

$$\begin{cases} P_{sw,sxp}(t) = k_s \cdot V_{dc} i_x(t) \cdot f_s \\ P_{sw,sxn}(t) = 0 \\ P_{sw,dxp}(t) = 0 \\ P_{sw,dxn}(t) = k_d \cdot V_{dc} i_x(t) \cdot f_s \end{cases} \text{for } i_x(t) \geq 0, \text{ and} \quad (10)$$

$$\begin{cases} P_{sw,sxp}(t) = 0 \\ P_{sw,sxn}(t) = k_s \cdot V_{dc} \cdot |i_x(t)| \cdot f_s \\ P_{sw,dxp}(t) = k_d \cdot V_{dc} \cdot |i_x(t)| \cdot f_s \\ P_{sw,dxn}(t) = 0 \end{cases} \text{for } i_x(t) < 0.$$

From equation (10), above, the total switching losses of the $S_{xp}$ and $S_{xn}$ IGBT switches 22 and the $D_{xp}$ and $D_{xn}$ diodes 24 for each leg of phase x (where x represents a, b, or c) may also be described as follows:

$$\begin{cases} P_{sw,sx}(t) = k_s \cdot V_{dc} |i_x(t)| \\ P_{sw,dx}(t) = k_d \cdot V_{dc} |i_x(t)| \end{cases}. \quad (11)$$

Because the conduction losses and switching losses represent the total losses for each leg of phase x (where x represents a, b, or c), total losses may be represented as:

$$\begin{cases} P_{sx}(t) = P_{cond,sx}(t) + P_{sw,sx}(t) \\ P_{dx}(t) = P_{cond,dx}(t) + P_{sw,dx}(t) \end{cases}. \quad (12)$$

The maximum junction temperatures of the IGBT switches 22 and diodes 24 of the three phase inverter module may be estimated using the equations describing the power losses of the three phase inverter module, above, keeping in mind three stipulations or assumptions. First, the bottom of the heat sink is treated as isothermal. Second, thermal coupling between the two chips is weak and may be neglected. Third, operating at a very low output frequency, because the output period is very large relative to the junction-to-heat-sink thermal time constants of the IGBT switches 22 and diodes 24, any corresponding thermal capacitance is negligible. Accordingly, the maximum junction temperature for the IGBT switches 22 and diodes 24 of each leg of the three phase inverter, $T_{jsx,max}$ and $T_{jds,max}$, respectively, may be represented as follows (where x represents leg a, b, or c):

$$\begin{cases} T_{jsx,max} \approx P_{sx} \cdot R_{i0} + T_h \\ T_{jdx,max} \approx P_{dx} \cdot R_{d0} + T_h \end{cases}. \quad (13)$$

In equation (13), above, $T_h$ represents the temperature at the bottom of the heat sink, which is determined largely by the ambient temperature and air flow through the heat sink. To simplify further analysis, $T_h$ may be treated as very nearly fixed, such that only the maximum temperature difference between the junction temperature and the heat sink temperature $T_h$ may be obtained. The maximum junction temperature relative to the heat sink temperature $T_h$, for the IGBT switches 22 and diodes 24 of each leg of the three phase inverter, $T_{jhsx,max}$ and $T_{jhdx,max}$, respectively, may thus be represented as follows (where x represents leg a, b, or c):

$$\begin{cases} T_{jhsx,\max} = T_{jsx,\max} - T_h \approx P_{sx} \cdot R_{i0} \\ T_{jhdx,\max} = T_{jdx,\max} - T_h \approx P_{dx} \cdot R_{d0} \end{cases} \quad (14)$$

An optimal maximum junction temperature for the entire three phase inverter may occur when total power losses are spread as evenly as possible across the components of the inverter. To simplify the analysis, only the output current phase angle $\theta_i$ between $(-\pi/6)$ and $(\pi/6)$ is initially examined, when phase A reaches its maximum phase current and phases B and C are both negative. The following equation thus represents a configuration when the maximum junction temperature relative to $T_h$ of the IGBT switches 22 of the leg is the same as that of the diodes 24 of the leg:

$$P_{sa}(t) \cdot R_{i0} = P_{da}(t) \cdot R_{d0} \quad (15).$$

By combining equation (15) with equations (8)-(11), an optimal common mode voltage duty ratio for phase A while $i_a \geq 0$, $d_{cm1}$, may be calculated:

$$d_{cm1} = \frac{[(1-d_a)V_f R_{d0} - d_a V_{ce} R_{i0}] \cdot i_a + P_{sw,da} - P_{sw,sa}}{(V_{ce} R_{i0} + V_f R_{d0}) \cdot i_a} - 0.5. \quad (16)$$

Recalling equation (8), above, when $i_a(t) \geq 0$, a reduction of the common mode voltage duty ratio $d_{cm}$ lowers the conduction losses of the $S_{ap}$ IGBT switch 22 and raises the conduction losses of the $D_{an}$ diode 24. If the $S_{ap}$ IGBT switch 22 is producing greater conduction losses than $D_{an}$ diode 24, reducing the common mode voltage duty ratio $d_{cm}$ would allow for greater parity in conduction losses between the $S_{ap}$ IGBT switch 22 and $D_{an}$ diode 24. However, because $i_b(t)<0$ and $i_c(t)<0$ when the output current phase angle $\theta_i$ is between $(-\pi/6)$ and $(\pi/6)$, any reduction in $d_{cm}$ would simultaneously raise the conduction losses of the $S_{bn}$ and $S_{cn}$ IGBT switches 22. Reducing $d_{cm}$ to lower conduction losses in the $S_{ap}$ IGBT switch 22 by too great an amount could therefore result in excessive heat losses in the $S_{bn}$ and $S_{cn}$ IGBT switches 22. To avoid reducing $d_{cm}$ excessively, the following condition should also be met:

$$P_{sa}(t) \geq P_{sb}(t) \text{ and } P_{sa}(t) \geq P_{sc}(t) \quad (17).$$

A lower bound of the optimized common mode voltage duty ratio $d_{cm2}$ for phases B and C may thus be determined by combining equations (17) and (8)-(12). Representing the lowest possible optimal common mode voltage duty ratio $d_{cm}$ when the output current phase angle $\theta_i$ is between $(-\pi/6)$ and $(\pi/6)$, $d_{cm2,y}$ may be represented as follows (where y represents phase b or c; $V_{ce,y}$ represents the forward voltage drop of the particular phase IGBT switch 22):

$$d_{cm2,y} = \frac{P_{sw,sy} - P_{sw,sa} + V_{ce,y} \cdot |i_y| \cdot (1-d_y) - V_{ce,a} \cdot i_a \cdot d_a}{V_{ce,a} \cdot i_a + V_{ce,y} \cdot |i_y|} - 0.5 \quad (18)$$

Again recalling equation (8), above, when $i_a(t) \geq 0$, an increase of the common mode voltage duty ratio $d_{cm}$ lowers the conduction losses of the $D_{an}$ diode 24 and raises the conduction losses of the $S_{ap}$ IGBT switch 22. If the $D_{an}$ diode 24 is producing greater conduction losses than the $S_{ap}$ IGBT switch 22, increasing the common mode voltage duty ratio $d_{cm}$ would allow for greater parity in conduction losses between the $S_{ap}$ IGBT switch 22 and $D_{an}$ diode 24. However, because $i_b(t)<0$ and $i_c(t)<0$ when the output current phase angle $\theta_i$ is between $(-\pi/6)$ and $(\pi/6)$, any increase in $d_{cm}$ would simultaneously raise the conduction losses of the $D_{bn}$ and $D_{cn}$ diodes 24. Increasing $d_{cm}$ to lower conduction losses in the $D_{an}$ diode 24 by too great an amount could therefore result in excessive heat losses in the $D_{bn}$ and $D_{cn}$ diodes 24. To avoid increasing $d_{cm}$ excessively, the following condition should also be met:

$$P_{da}(t) \geq P_{db}(t) \text{ and } P_{da}(t) \geq P_{dc}(t) \quad (19)$$

An upper bound of the optimized common mode voltage duty ratio $d_{cm3}$ for phases B and C may thus be determined by combining equations (17) and (8)-(12). Representing the highest possible optimal common mode voltage duty ratio $d_{cm}$ when the output current phase angle $\theta_i$ is between $(-\pi/6)$ and $(\pi/6)$, $d_{cm3,y}$ may be represented as follows (where y represents phase b or c; $V_{f,y}$ represents the forward voltage drop of the particular phase IGBT switch 22):

$$d_{cm3,y} = \frac{P_{sw,da} - P_{sw,dy} + V_{f,a} \cdot i_a \cdot (1-d_a) - V_{f,y} \cdot |i_y| \cdot d_y}{V_{f,a} \cdot i_a + V_{f,y} \cdot |i_y|} - 0.5. \quad (20)$$

For any instantaneous output current phase angle $\theta_i$ between $(-\pi/6)$ and $(\pi/6)$, an optimal common mode voltage duty ratio $d_{cm}$ may be obtained from equations (16), (18), and (20). On the leg carrying phase A, optimal common mode voltage duty ratio $d_{cm1}$ represents a value for $d_{cm}$ which most evenly distributes the conduction losses between the $S_{ap}$ IGBT switch 22 and $D_{an}$ diode 24. If the value of $d_{cm1}$ remains above the lower bound optimal common mode voltage duty ratio $d_{cm2}$ (where $d_{cm2}$ is the higher of $d_{cm2,b}$ and $d_{cm2,c}$) and below the upper bound common mode voltage duty ratio $d_{cm3}$ (where $d_{cm3}$ is the lower of $d_{cm3,b}$ and $d_{cm3,c}$), then $d_{cm1}$ also represents the optimized common mode voltage $d_{cm}$. However, if $d_{cm1}$ is lower than the lower bound optimal common mode voltage duty ratio $d_{cm2}$, then $d_{cm2}$ represents the optimized common mode voltage duty ratio $d_{cm}$. Similarly, if $d_{cm1}$ is higher than the upper bound optimal common mode voltage duty ratio $d_{cm3}$, then $d_{cm3}$ represents the optimized common mode voltage duty ratio $d_{cm}$. When the control circuitry 34 of a motor control system employs the above common mode voltage duty ratio $d_{cm}$, the resulting control signals may provide the inverter module 20 a higher maximum junction temperature rating.

Figure 5:
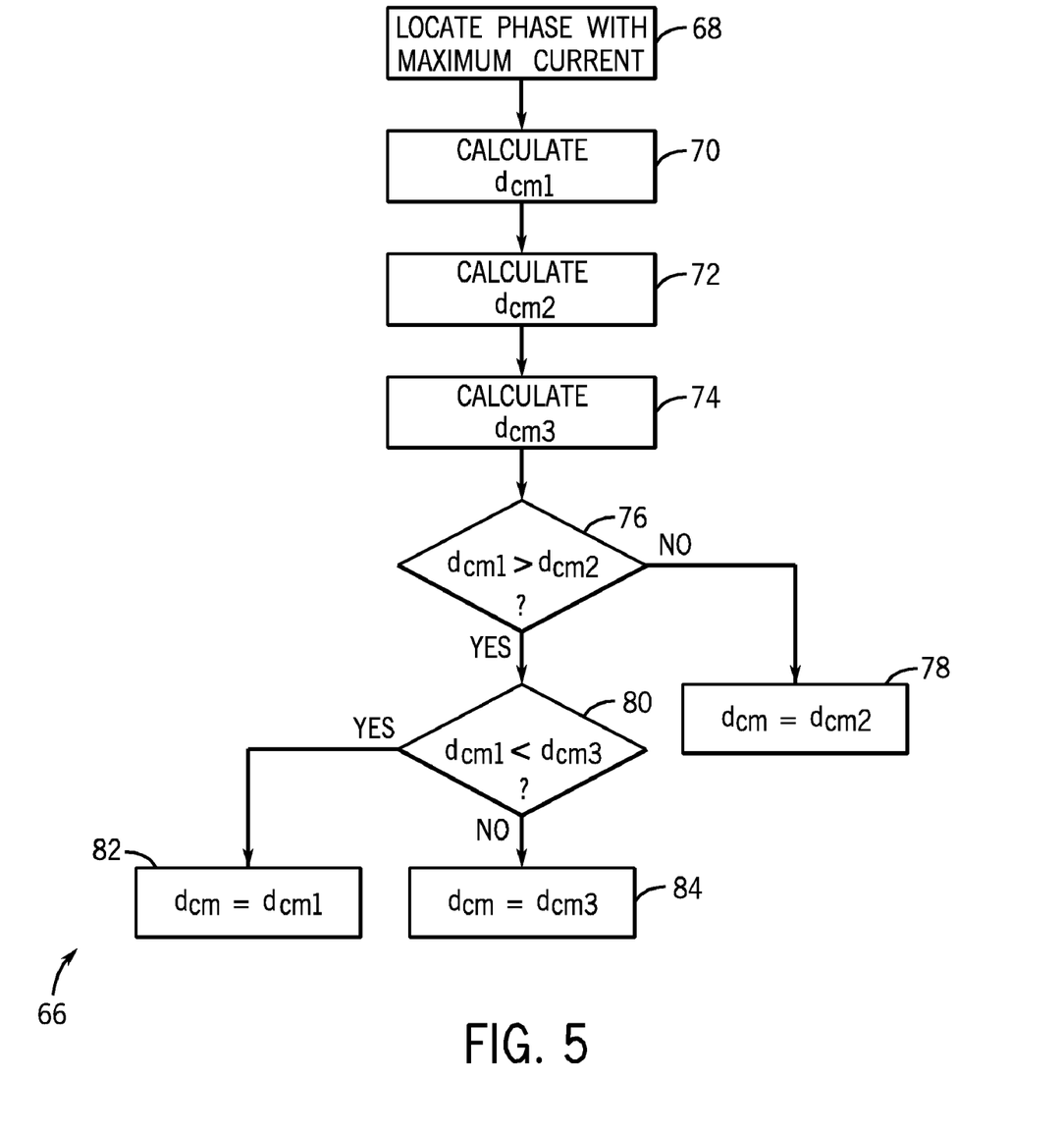
FIG. 5 is a flowchart illustrating a method of determining an optimal common mode voltage duty ratio in accordance with one embodiment of the present invention.

Though the above analysis stipulates an output current phase angle $\theta_i$ between $(-\pi/6)$ and $(\pi/6)$, FIG. 5 illustrates a more general method of obtaining an optimal common mode voltage duty ratio $d_{cm}$ for any given output current phase angle $\theta_i$. The $d_{cm}$ determination flowchart 66 begins with step 68, to locate the phase with maximum current. If the output current phase angle $\theta_i$ is between $(-\pi/6)$ and $(\pi/6)$, as well as any multiple of $(2\pi)$ in addition to or subtracted from between $(-\pi/6)$ and $(\pi/6)$, the maximum current occurs in phase A, while the currents of phases B and C are negative. If the output current phase angle $\theta_i$ is between $(\pi/6)$ and $(5\pi/6)$, as well as any multiple of $(2\pi)$ in addition to or subtracted from between $(\pi/6)$ and $(5\pi/6)$, the maximum current occurs in phase B, while the currents of phases A and C are negative. Finally, if the output current phase angle $\theta_i$ is between $(5\pi/6)$ and $(3\pi/2)$, as well as all multiples of $(2\pi)$ in addition to or subtracted from between $(5\pi/6)$ and $(3\pi/2)$, the maximum current occurs in phase C, while the currents of phases A and B are negative.

After locating the phase with the maximum current per step 68, step 70 next prescribes calculating the value of the maximum phase current optimal common mode voltage duty ratio $d_{cm1}$. As discussed above, $d_{cm1}$ represents a value for $d_{cm}$ which most evenly distributes the conduction losses between the $S_{xp}$ IGBT switch 22 and $D_{xn}$ diode 24 (where x represents the phase with maximum current located in step 68). If $d_{cm1}$ is a value less than zero, the reduction in $d_{cm}$ would cause fewer conduction losses in the $S_{xp}$ IGBT switch 22 and greater conduction losses in the $D_{xn}$ diode 24. On the other hand, if $d_{cm1}$ is a value greater than zero, the increase in $d_{cm}$ would cause fewer conduction losses in the $D_{an}$ diode 24 and greater conduction losses in the $S_{ap}$ IGBT switch 22. The value of $d_{cm1}$ may be expressed in the general equation below (where x represents the phase with maximum current located in step 68):

$$d_{cm1} = \frac{[(1-d_x)V_f R_{d0} - d_x V_{ce} R_{i0}] \cdot i_x + P_{sw,dx} - P_{sw,sx}}{(V_{ce} R_{i0} + V_f R_{d0}) \cdot i_x} - 0.5. \quad (21)$$

Step 72 next prescribes calculating the value of the lower bound optimal common mode voltage duty ratio $d_{cm2}$. To obtain $d_{cm2}$, the value $d_{cm2,y}$ may be first calculated for each phase y (where y represents the phases other than phase x, the phase with maximum current located in step 68):

$$d_{cm2,y} = \frac{P_{sw,sy} - P_{sw,sx} + V_{ce,y} \cdot |i_y| \cdot (1-d_y) - V_{ce,x} \cdot i_x \cdot d_x}{V_{ce,x} \cdot i_x + V_{ce,y} \cdot |i_y|} - 0.5. \quad (22)$$

The value of $d_{cm2,y}$ for each phase y represents the lower bound optimal common mode voltage duty ratio of that phase, or the point at which $d_{cm}$ could not be further reduced without creating excessive conduction losses in the $S_{yn}$ IGBT switches 22 of each phase y (where y represents the phases other than phase x, the phase with maximum current located in step 68). Accordingly, the higher of the two values of $d_{cm2,y}$ represents the lower bound optimal common mode voltage duty ratio $d_{cm2}$ of the entire inverter module. Step 72 thus completes when the higher value of $d_{cm2,y}$ is chosen as the lower bound optimal common mode voltage duty ratio $d_{cm2}$.

Proximate step 74 prescribes calculating the value of the upper bound optimal common mode voltage duty ratio $d_{cm3}$. To obtain $d_{cm3}$, the value $d_{cm3,y}$ may be first calculated for each phase y (where y represents the phases other than phase x, the phase with maximum current located in step 68):

$$d_{cm3,y} = \frac{P_{sw,dx} - P_{sw,dy} + V_{f,x} \cdot i_x \cdot (1-d_x) - V_{f,y} \cdot |i_y| \cdot d_y}{V_{f,x} \cdot i_x + V_{f,y} \cdot |i_y|} - 0.5. \quad (23)$$

Since the value of $d_{cm3,y}$ for each phase y represents the upper bound optimal common mode voltage duty ratio of that phase, or the point at which $d_{cm}$ could not be further increased without creating excessive conduction losses in the $D_{yp}$ diodes 24 of each phase y (where y represents the phases other than phase x, the phase with maximum current located in step 68). Accordingly, the lower of the two values of $d_{cm3,y}$ represents the lower bound optimal common mode voltage duty ratio $d_{cm3}$ of the entire inverter module. Step 74 terminates when the lower value of $d_{cm3,y}$ is chosen as the upper bound optimal common mode voltage duty ratio $d_{cm2}$.

Continuing to follow the $d_{cm}$ determination flowchart 66 of FIG. 5, and having calculated $d_{cm1}$, $d_{cm2}$, and $d_{cm3}$, the remaining decision blocks and steps describe how to choose the optimal common mode voltage duty ratio $d_{cm}$ from among $d_{cm1}$, $d_{cm2}$, and $d_{cm3}$. Decision block 76 compares the values of the maximum phase current optimal common mode voltage duty ratio $d_{cm1}$ with the lower bound optimal common mode voltage duty ratio $d_{cm2}$. As discussed above, $d_{cm2}$ represents the lowest possible reduction of $d_{cm}$ available before the $S_{yn}$ IGBT switches 22 (where y represents the two phases not carrying the maximum current) would produce excessive conduction losses. If $d_{cm1}$ is not greater than the lower bound $d_{cm2}$, decision block 76 directs the process flow to step 78, illustrating that the maximum inverter module junction temperature reduction will occur when the common mode voltage duty ratio $d_{cm}$ is equal to $d_{cm2}$. If decision block 76 determines $d_{cm1}$ is greater than or equal to the lower bound $d_{cm2}$, the process instead flows to decision block 80.

Decision block 80 compares the values of the maximum phase current optimal common mode voltage duty ratio $d_{cm1}$ with the upper bound optimal common mode voltage duty ratio $d_{cm3}$. As discussed above, $d_{cm3}$ represents the greatest possible increase in $d_{cm}$ available before the $D_{yp}$ diodes 24 (where y represents the two phases not carrying the maximum current) would produce excessive conduction losses. If $d_{cm1}$ is less than the upper bound $d_{cm3}$, decision block 80 directs the process flow to step 82, as the maximum inverter module junction temperature reduction will occur when the common mode voltage duty ratio $d_{cm}$ is equal to $d_{cm1}$. If $d_{cm1}$ is not less than or equal to the upper bound $d_{cm3}$, however, decision block 80 instead directs the process flow to step 84, as the maximum inverter module junction temperature reduction will occur when the common mode voltage duty ratio $d_{cm}$ is equal to $d_{cm3}$. Upon reaching any of steps 78, 82, or 84, the value of $d_{cm}$ for a given output current phase angle $\theta_i$ is determined and the $d_{cm}$ determination flowchart 66 terminates.

It should be noted that in the approach outlined in FIG. 5, the maximum current is positive. In a more general case, the algorithm may determine whether the maximum current is positive or negative, and, if it is negative, the values for the phase currents are inverted in step 68 (i.e., $i_a = -i_a$, $i_b = -i_b$, $i_c = -i_c$). The calculations and comparisons summarized above may then proceed based upon these inverted values. However, in the case of a negative maximum current, the resulting value of $d_{cm}$ is also inverted in step 48 (i.e., $d_{cm} = -d_{cm}$). That is, the value of $d_{cm}$ is negative when the maximum current is negative.

Figure 6:
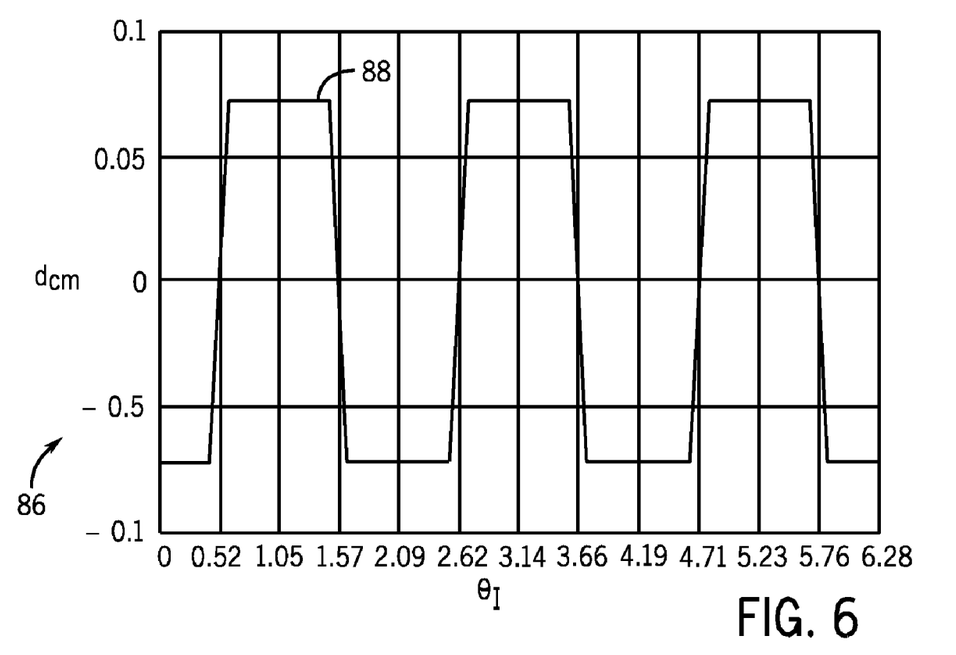
FIG. 6 represents a plot of an optimized common mode voltage duty ratio over one output period at a DC or very low speed AC condition when the switching frequency is 4 kHz, in accordance with one embodiment of the present invention.
Figure 7:
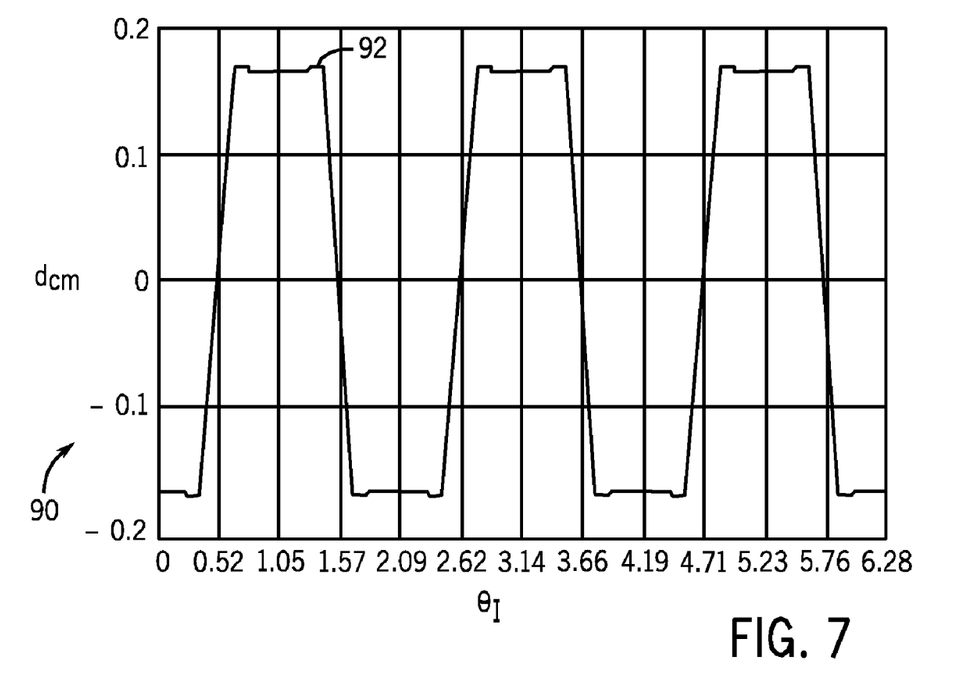
FIG. 7 represents a plot of an optimized common mode voltage duty ratio over one output period at a DC or very low speed AC condition when the switching frequency is 8 kHz, in accordance with one embodiment of the present invention.

FIGS. 6 and 7 illustrate the real-time determinations of $d_{cm}(\theta_i)$ for a Rockwell 480V/50 hp drive with a DC bus voltage of 650V and 77 $A_{rms}$ inverter current across one output period, operating with a switching frequency $f_s$ of 4 kHz and 8 kHz, respectively. Turning to FIG. 6, with an ordinate reflecting values of $d_{cm}$ and an abscissa reflecting the inverter module output current phase angle $\theta_i$ from 0 to 6.28 ($2\pi$) radians, plot 86 shows the real-time relationship between $d_{cm}$ and $\theta_i$. When $\theta_i$ is 0 radians, real-time $d_{cm}(\theta_i)$ value 88 begins near −0.07 and remains flat until around 0.35 ($\pi/9$) radians, when it rises essentially linearly to near 0.07 by 0.70 ($2\pi/9$) radians. The real-time $d_{cm}(\theta_i)$ value 88 remains near 0.07 from 0.70 ($2\pi/9$) radians to around 1.40 ($4\pi/9$) radians, before returning again to −0.07 by 1.75 ($5\pi/9$) radians. From 1.75 ($5\pi/9$) radians to 2.45 ($7\pi/9$) radians, the real-time $d_{cm}(\theta_i)$ value 88 remains near −0.07, at which point the real-time $d_{cm}(\theta_i)$ value 88 then rises again to 0.07 by 2.80 ($8\pi/9$) radians. Plot 86 makes apparent that the real-time $d_{cm}(\theta_i)$ value 88 varies with a period of ($2\pi/3$) radians, reaching a trough from (−$\pi/9$) to ($\pi/9$) radians and a crest from ($2\pi/9$) to ($4\pi/9$) radians.

Turning now to FIG. 7, with an ordinate reflecting values of $d_{cm}(\theta_i)$ and an abscissa reflecting the inverter module output current phase angle $\theta_i$ from 0 to 6.28 ($2\pi$) radians, plot 90 similarly illustrates the real-time relationship between $d_{cm}$ and $\theta_i$ when the switching frequency is 8 kHz. Plot 90 makes apparent that the real-time $d_{cm}(\theta_i)$ value 92 varies with a period of $(2\pi/3)$ radians, reaching a trough of around $-0.17$ from $(-\pi/9)$ to $(\pi/9)$ radians and a crest of around $0.17$ from $(2\pi/9)$ to $(4\pi/9)$ radians. Although the real-time $d_{cm}(\theta_i)$ value 92 briefly retreats by a small amount after reaching the minimum and minimum values of $d_{cm}(\theta_i)$, plot 90 of FIG. 7 only significantly varies from plot 86 in the magnitude of the real-time $d_{cm}(\theta_i)$.

Though a motor drive system may calculate the optimal common mode voltage duty ratio $d_{cm}(\theta_i)$ in real-time, two alternative methods of closely estimating $d_{cm}(\theta_i)$ may prove more efficient. Under both methods of closely estimating optimal common mode voltage $d_{cm}(\theta_i)$, the amplitude of $d_{cm}(\theta_i)$, termed $d_m$, is first determined according to the equation below:

$$d_m = d_{cm}(0) \tag{24}$$

The amplitude $d_m$ may be calculated by the control circuitry 34 of a motor drive if supplied necessary data, or may be calculated prior to manufacture and stored in a lookup table in memory. If calculated prior to manufacture, a range of possible amplitudes $d_m$ may be calculated for a variety potential motor drive components.

A first method of estimating $d_{cm}(\theta_i)$ appears in the equation below, where $d_{cm}(\theta_i)$ is estimated as a cosine wave with amplitude $d_m$:

$$d_{cm}'(\theta_i) = d_m \cos(3 \cdot \theta_i) \tag{25}$$

A second method of estimating $d_{cm}(\theta_i)$ involves the discrete equation below:

$$d_{cm}''\left(\theta_i + k \cdot \frac{2\pi}{3}\right) = \begin{cases} d_m & -\frac{\pi}{9} < \theta_i < \frac{\pi}{9} \\ 0 & \frac{\pi}{9} < \theta_i < \frac{2\pi}{9} \\ -d_m & \frac{2\pi}{9} < \theta_i < \frac{4\pi}{9} \\ 0 & \frac{4\pi}{9} < \theta_i < \frac{5\pi}{9} \end{cases} \quad k = 0, 1, \ldots \tag{26}$$

The second method of equation (26), above, provides a slightly closer approximation of $d_{cm}(\theta_i)$ than the first method, offering an inverter module maximum junction temperature only very slightly higher than a real-time calculation of $d_{cm}(\theta_i)$. To implement the second method of estimating $d_{cm}(\theta_i)$, the control circuitry 34 of a motor drive may employ a lookup table based on the value of output current phase angle $\theta_i$. Through a lookup table or similar mechanism, the second method of estimating $d_{cm}(\theta_i)$ could provide an efficient method of reducing the maximum junction temperature of an inverter module operating at very low frequency or a DC condition.

Figure 8:
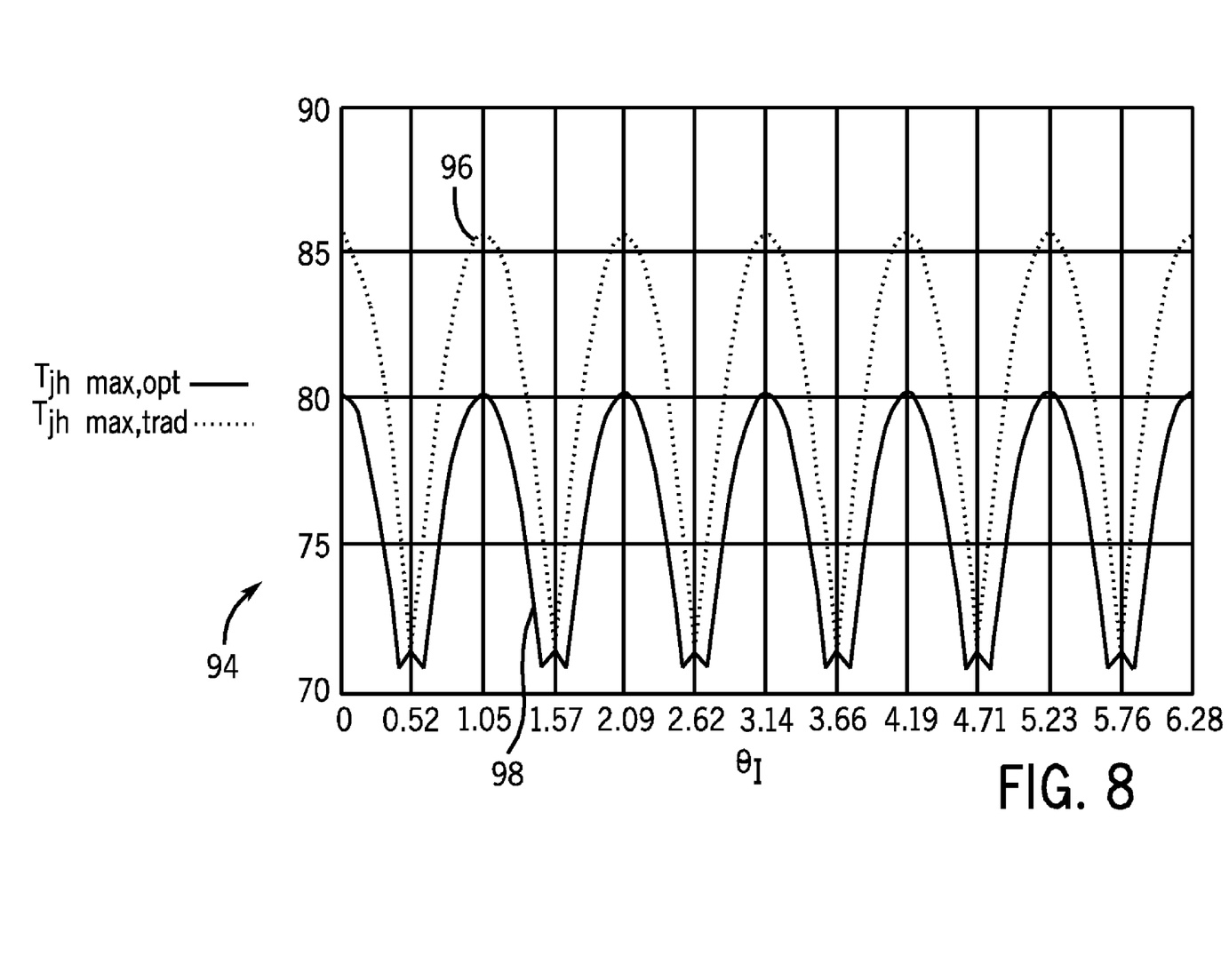
FIG. 8 illustrates two plots of real-time maximum junction temperature over one output period under low speed AC condition when the switching frequency is 4 kHz, the first plot calculated using a traditional common mode voltage duty ratio and the second calculated using an optimized common mode voltage duty ratio in accordance with one embodiment of the present invention.
Figure 9:
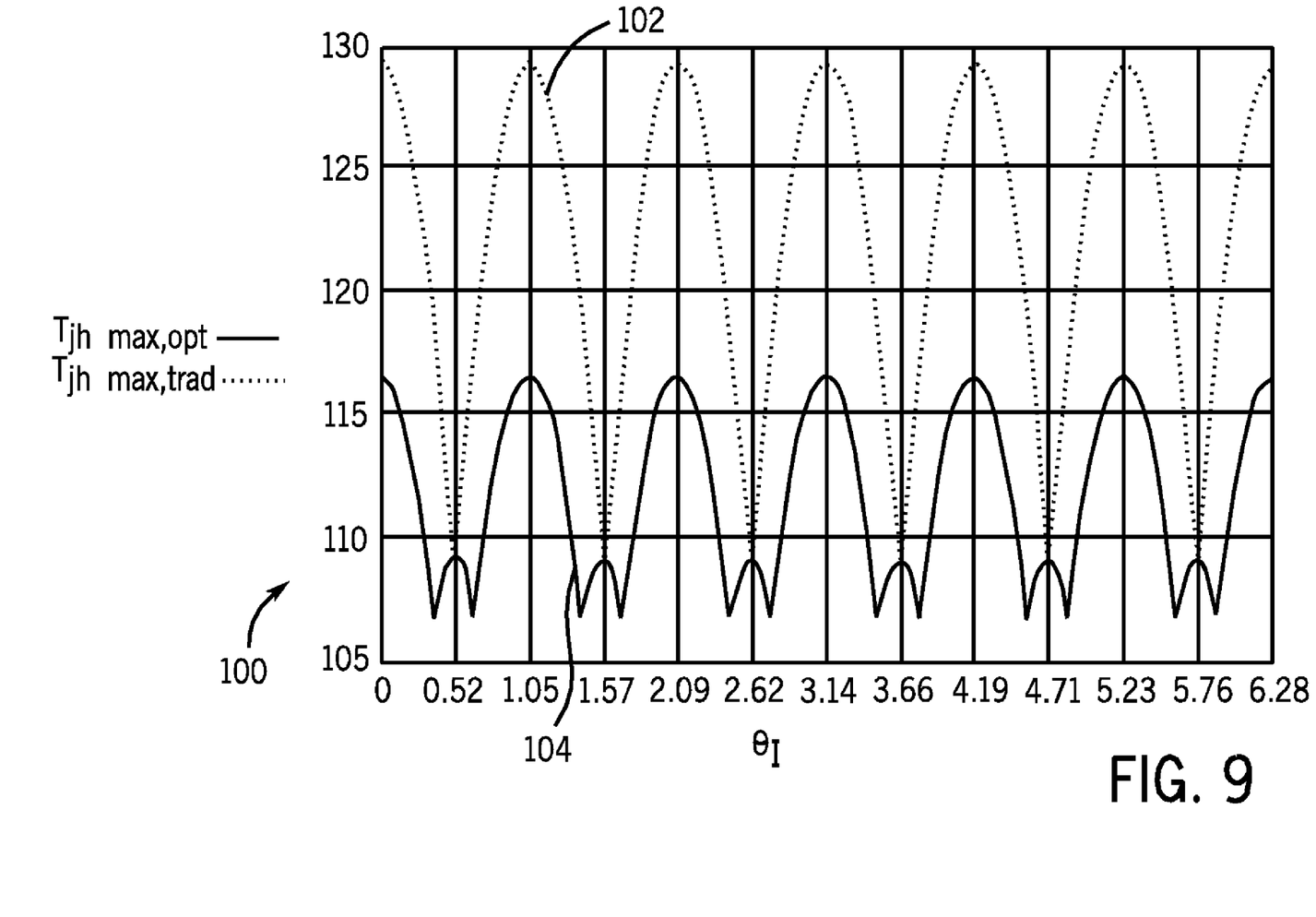
FIG. 9 illustrates two plots of real-time maximum junction temperature over one output period under low speed AC condition when the switching frequency is 8 kHz, the first calculated using a traditional common mode voltage duty ratio and the second calculated using an optimized common mode voltage duty ratio in accordance with one embodiment of the present invention.
Figure 10:
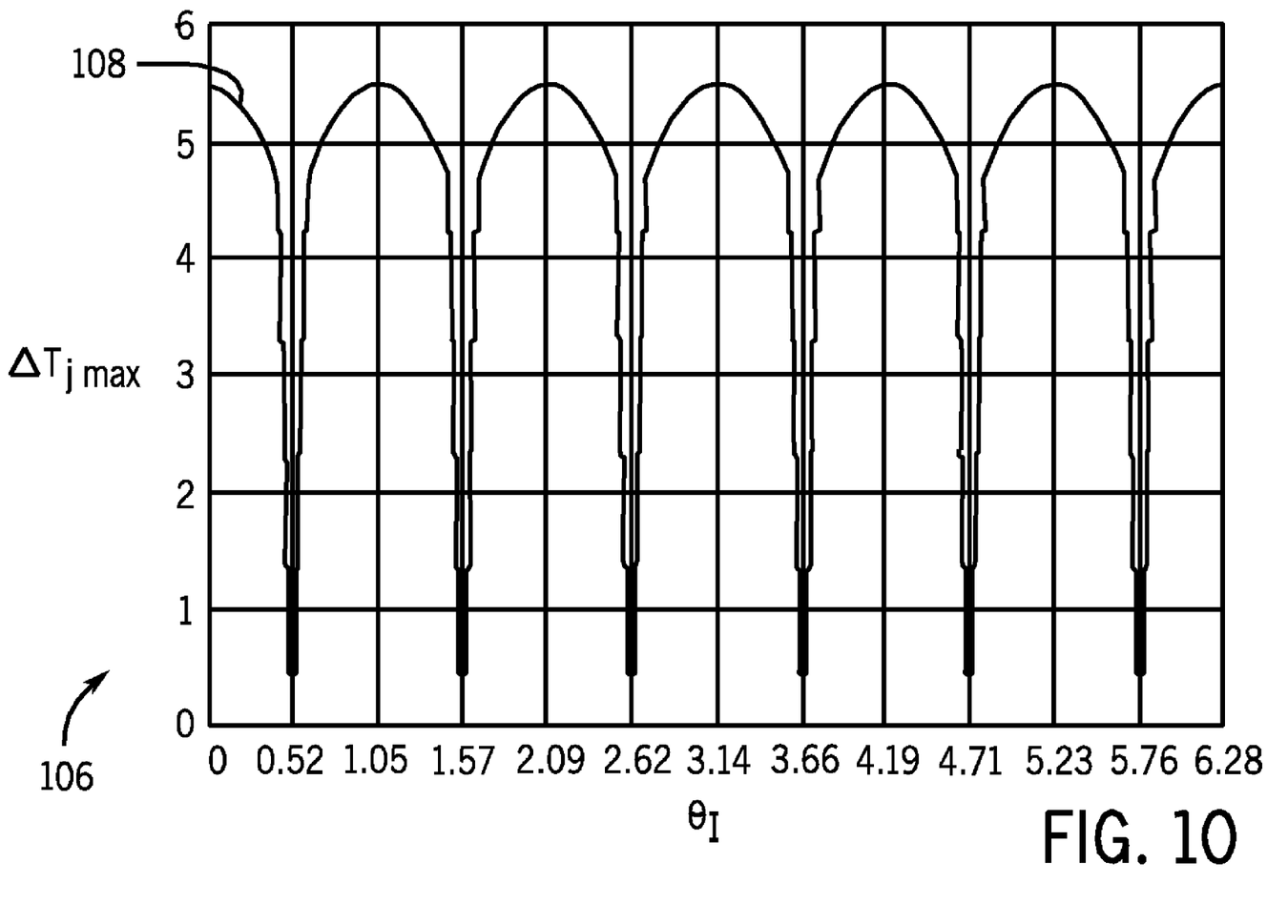
FIG. 10 illustrates the difference between traditional and optimized maximum junction temperatures over one output period under low speed AC condition when the switching frequency is 4 kHz, in accordance with one embodiment of the present invention.
Figure 11:
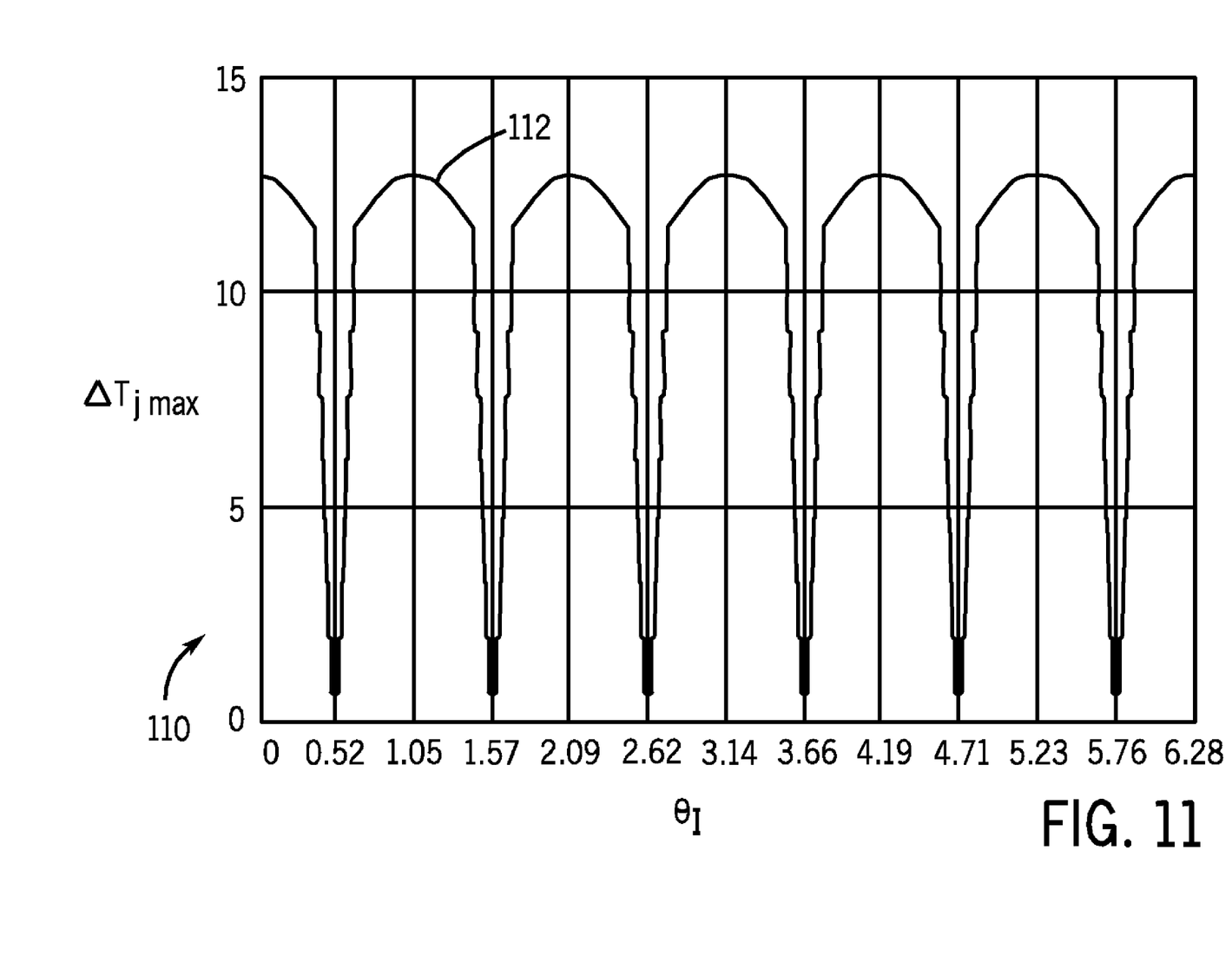
FIG. 11 illustrates the difference between traditional and optimized maximum junction temperatures over one output period under low speed AC condition when the switching frequency is 8 kHz, in accordance with one embodiment of the present invention.

FIGS. 8-11 illustrate the potential improvement in maximum junction temperature rating for a motor drive operating at very low frequency or a DC condition under the present methods. FIGS. 8 and 9 illustrate the maximum junction temperature under traditional conditions, $T_{jh,max,trad}$, and maximum junction temperature when the common mode voltage duty ratio $d_{cm}$ is optimized, $T_{jh,max\,opt}$, for an inverter module operating with a switching frequency $f_s$ of 4 kHz and 8 kHz, respectively. FIGS. 10 and 11 illustrate the maximum junction temperature difference $\Delta T_{j,max}$ between the maximum junction temperature under traditional conditions and maximum junction temperature when the common mode voltage duty ratio $d_{cm}$ is optimized, for an inverter module operating with a switching frequency of 4 kHz and 8 kHz, respectively.

Plot 94 of FIG. 8 has an ordinate representing the maximum junction temperature in ° C. and an abscissa in radians over one period of the output current phase angle $\theta_i$, describing the maximum junction temperature of an inverter operating at a switching frequency $f_s$ of 4 kHz. The real-time maximum junction temperature under traditional conditions $T_{jh,max,trad}$ 96 reaches a peak of almost 86° C. at 0 radians and drops to 72° C. by 0.52 ($\pi/6$) radians, repeating every 1.05 ($\pi/3$) radians. In contrast, the optimized real-time maximum junction temperature $T_{jh,max}$ opt 98 reaches a peak of around 80° C. at 0 radians and drops to 72° C. by 0.52 ($\pi/6$) radians, also repeating every 1.05 ($\pi/3$) radians.

Plot 100 of FIG. 9 has an ordinate representing the maximum junction temperature in ° C. and an abscissa in radians over one period of the output current phase angle $\theta_i$, describing the maximum junction temperature of an inverter operating at a switching frequency $f_s$ of 8 kHz. The real-time maximum junction temperature under traditional conditions $T_{jh,max,trad}$ 102 reaches a peak of 129° C. at 0 radians and drops to 109° C. by 0.52 ($\pi/6$) radians, repeating every 1.05 ($\pi/3$) radians. In contrast, the optimized real-time maximum junction temperature $T_{jh,max,opt}$ reaches a peak of almost 117° C. at 0 radians and drops to 109° C. by 0.52 ($\pi/6$) radians, also repeating every 1.05 ($\pi/3$) radians.

FIG. 10 features a plot 106 of the maximum junction temperature difference, $\Delta T_{j,max}$, between the maximum junction temperature under traditional conditions and the optimized maximum junction temperature of an inverter module operating with a switching frequency $f_s$ of 4 kHz. With an ordinate illustrating the difference in maximum temperature in ° C. and an abscissa in radians over one period of the output current phase angle $\theta_i$, plot 106 illustrates a real-time maximum junction temperature difference $\Delta T_{j,max}$ 108 of up to nearly 5.5° C. when phase angle $\theta_i$ is 0 and at multiples of 1.05 ($\pi/3$) radians.

FIG. 11 provides a plot 110 of the maximum junction temperature difference, $\Delta T_{j,max}$, between the maximum junction temperature under traditional conditions and the optimized maximum junction temperature of an inverter module operating with a switching frequency $f_s$ of 8 kHz. With an ordinate illustrating the difference in maximum temperature in ° C. and an abscissa in radians over one period of the output current phase angle $\theta_i$, plot 110 illustrates a real-time maximum junction temperature difference $\Delta T_{j,max}$ 112 of up to nearly 13° C. when phase angle $\theta_i$ is 0 and at multiples of 1.05 ($\pi/3$) radians.

As a result of higher maximum junction temperature ratings made available from an optimized common mode voltage duty ratio $d_{cm}$, the inverter module current rating may increase from 5% to 12.5%, depending on the switching frequency $f_s$. The table below describes an improvement possible for a Rockwell 480V/50 hp drive with a DC bus voltage of 650V:

|  | Switching Frequency $f_s$ | | | |
| --- | --- | --- | --- | --- |
|  | 4 kHz | 8 kHz | 12 kHz | 16 kHz |
| $I_{smax,trad}$ (traditional method) ($A_{rms}$) | 77.0 | 53.7 | 40.5 | 32.3 |
| $I_{smax,opt}$ (optimal method) ($A_{rms}$) | 81.1 | 59.1 | 45.6 | 36.1 |
| Current Rating Increase | 5.3% | 10.0% | 12.5% | 11.6% |

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of controlling a motor, comprising:
varying a common mode voltage duty ratio for a plurality of solid state switching devices in a power inverter, such that the temperature differences between the solid state switching devices for multiple phases of power are reduced;
generating drive signals for the solid state switching devices based at least in part upon the common mode voltage duty ratio; and
changing states of the solid state switching devices based upon the drive signals.

2. The method of claim 1, comprising determining a phase angle of output power from the solid state switching devices, and varying the common mode voltage duty ratio based upon the phase angle.

3. The method of claim 2, wherein the phase angle is a current phase angle for one phase of three phase output from the inverter.

4. The method of claim 2, wherein the common mode voltage duty ratio is varied based upon a predetermined duty ratio schedule depending on the phase angle.

5. The method of claim 4, wherein the predetermined duty ratio schedule is computed based upon a comparison of duty ratios to determine a common mode voltage duty ratio that minimizes temperature differences between solid state switching devices for multiple phases of power.

6. The method of claim 5, wherein the predetermined duty ratio schedule is computed based upon a comparison of duty ratios to determine a common mode voltage duty ratio that minimizes temperature differences between solid state switching devices and associated diodes.

7. The method of claim 1, comprising determining an amplitude of an optimal common mode voltage duty ratio and varying the common mode voltage duty ratio as a periodic function with amplitude equal to the amplitude of the optimal common mode voltage duty ratio.

8. The method of claim 7, comprising estimating the optimal common mode voltage duty ratio as a discrete periodic function with an amplitude equal to the maximum magnitude of the optimal common mode voltage duty ratio.

9. The method of claim 1, comprising varying the common mode voltage duty ratio by determining a first possible common mode voltage duty ratio which minimizes the temperature differences between a solid state switching device and a diode of a first leg carrying a maximum phase current, a second possible common mode voltage duty ratio which equates the temperature difference between the solid state switching device and the diode of the first leg and the temperature difference between both the solid state switching device and the diode of the first leg and a solid state switching device of another leg, and a third possible common mode voltage duty ratio which equates the temperature difference between the solid state switching device and the diode of the first leg and the temperature difference between both the solid state switching device and the diode of the first leg and a diode of another leg, and choosing the common mode voltage duty ratio to be the second possible common mode voltage duty ratio if the first possible common mode voltage duty ratio is lower, choosing the common mode voltage duty ratio to be the third possible common mode voltage duty ratio if the first possible common mode voltage duty ratio is lower, otherwise choosing the common mode voltage duty ratio to be the first possible common mode voltage duty ratio.

10. The method of claim 1, wherein the common mode voltage duty ratio is varied only when the output power has a frequency below approximately 5 Hz.

11. A motor controller comprising:
an inverter including a plurality of solid state switching devices and associated flyback diodes, the switching devices and diodes being interconnected to form a three phase inverter; and
control circuitry coupled to the inverter and configured to vary a common mode voltage duty ratio for switching the solid state switching devices, and to generate drive signals for the solid state switching devices based upon the common mode duty ratio, and wherein the control circuitry is configured to vary the common mode voltage duty ratio such that the temperature differences between the solid state switching devices for multiple phases of power are reduced.

12. The motor controller of claim 11, wherein the control circuitry is configured to vary the common mode voltage duty ratio such that the temperature differences between solid state switching devices and associated flyback diodes of at least one phase of power are reduced.

13. The motor controller of claim 11, wherein the control circuitry is configured to determine the phase angle of the output power and to vary the common mode voltage duty ratio as a function of the phase angle.

14. The motor controller of claim 13, wherein the control circuitry is configured to determine an optimal common mode voltage duty ratio amplitude ($d_m$).

15. The motor controller of claim 14, wherein the control circuitry is configured to determine the optimal common mode voltage duty ratio amplitude ($d_m$) according to the following equation: $d_m = d_{cm}(0)$.

16. The motor controller of claim 14, wherein the control circuitry is configured to vary the common mode voltage duty ratio as a function of phase angle according to the equation: $d_{cm}'(\theta_i) = d_m \cos(3 \cdot \theta_i)$.

17. The motor controller of claim 14, wherein the control circuitry is configured to vary the common mode voltage duty ratio as a function of phase angle according to the equation:

$$d_{cm}''\left(\theta_i + k \cdot \frac{2\pi}{3}\right) = \begin{cases} d_m & -\frac{\pi}{9} < \theta_i < \frac{\pi}{9} \\ 0 & \frac{\pi}{9} < \theta_i < \frac{2\pi}{9} \\ -d_m & \frac{2\pi}{9} < \theta_i < \frac{4\pi}{9} \\ 0 & \frac{4\pi}{9} < \theta_i < \frac{5\pi}{9} \end{cases} \quad k = 0, 1, \ldots.$$

18. The motor controller of claim 14, comprising memory circuitry with possible values of the optimal common mode voltage duty ratio amplitude ($d_m$) from which the control circuitry may determine the optimal common mode voltage duty ratio amplitude ($d_m$).

19. A method of controlling a motor, comprising:
determining a first possible optimal common mode voltage duty ratio which reduces the temperature differences among a plurality of solid state switching devices and associated diodes on a leg carrying maximum current in a power inverter;
determining a second possible optimal common mode voltage duty ratio which causes the temperature of a plurality of solid state switching devices on a leg not carrying maximum current to equate to the temperature of the plurality of solid state switching devices on the leg carrying maximum current in the power inverter;

determining a third possible optimal common mode voltage duty ratio which causes the temperature of a plurality of diodes on a leg not carrying maximum current to equate to the temperature of the plurality of solid state switching devices on the leg carrying maximum current in the power inverter;

choosing an optimal common mode voltage duty ratio from among the first possible optimal common mode voltage duty ratio, second possible common mode voltage duty ratio, and third possible common mode voltage duty ratio;

varying a common mode voltage duty ratio for a plurality of solid state switching devices in the power inverter according to the optimal common mode voltage duty ratio;

generating drive signals for the solid state switching devices based at least in part upon the common mode voltage duty ratio; and changing states of the solid state switching devices based upon the drive signals.

20. The method of claim 19, wherein choosing the optimal common mode voltage duty ratio comprises storing the amplitude of the optimal common mode voltage duty ratio in memory circuitry.

21. The method of claim 20, comprising determining the first possible optimal common mode voltage duty ratio, determining the second possible optimal common mode voltage duty ratio, determining the third possible optimal common mode voltage duty ratio, and choosing the optimal common mode voltage duty ratio before a motor has begun to operate.

22. The method of claim 19, comprising determining a phase angle of an output current of the inverter varying the common mode voltage duty ratio and determining the first possible optimal common mode voltage duty ratio, second possible optimal common mode voltage duty ratio, and third possible optimal common mode voltage duty ratio according to the phase angle.

23. The method of claim 22, wherein varying the common mode voltage duty ratio comprises determining a phase angle of an output current of the inverter and varying the common mode voltage duty ratio according to the phase angle.

24. The method of claim 19, comprising varying the common mode voltage duty ratio only when a desired output power frequency is below approximately 5 Hz.

25. A motor controller comprising:

an inverter including a plurality of solid state switching devices and associated flyback diodes, the switching devices and diodes being interconnected to form a three phase inverter; and control circuitry coupled to the inverter and configured to vary a common mode voltage duty ratio for switching the solid state switching devices, and to generate drive signals for the solid state switching devices based upon the common mode duty ratio, and wherein the control circuitry is configured to vary the common mode voltage duty ratio such that the temperature differences between solid state switching devices and associated flyback diodes of at least one phase of power are reduced.

* * * * *